UNITED STATES PATENT OFFICE.

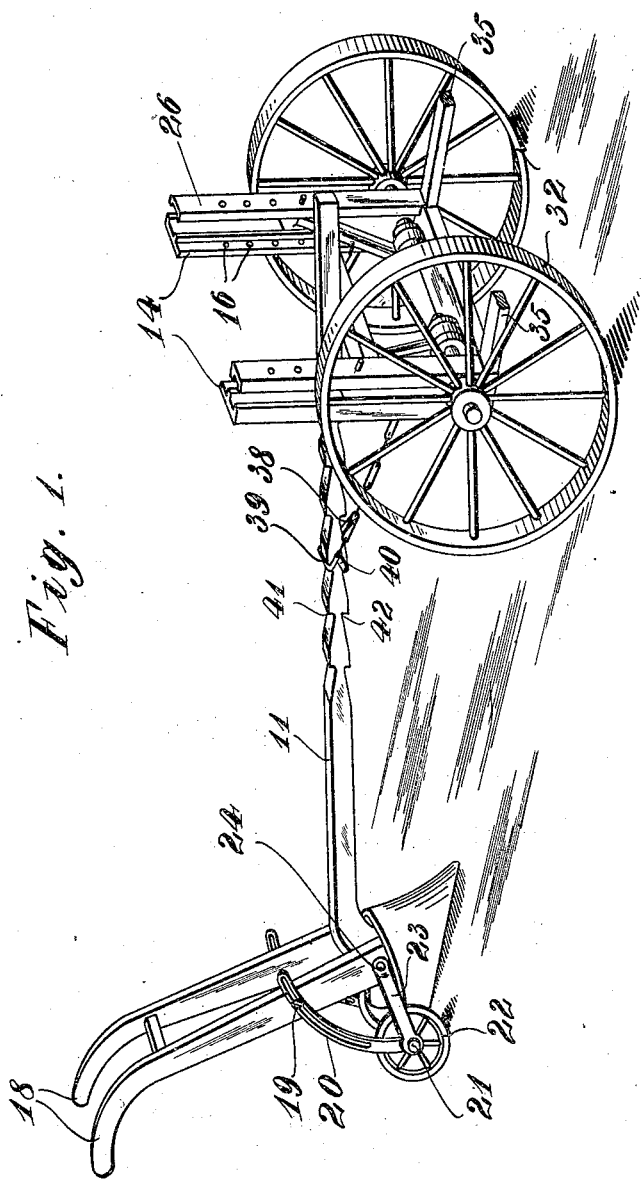

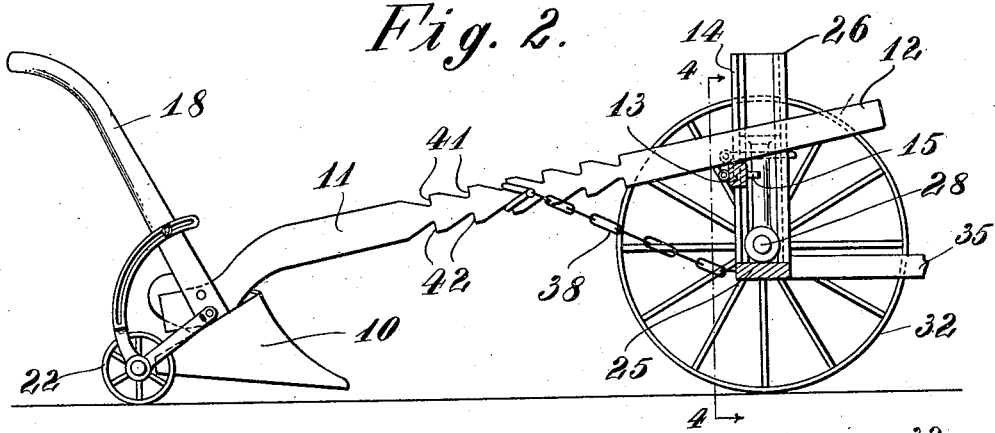
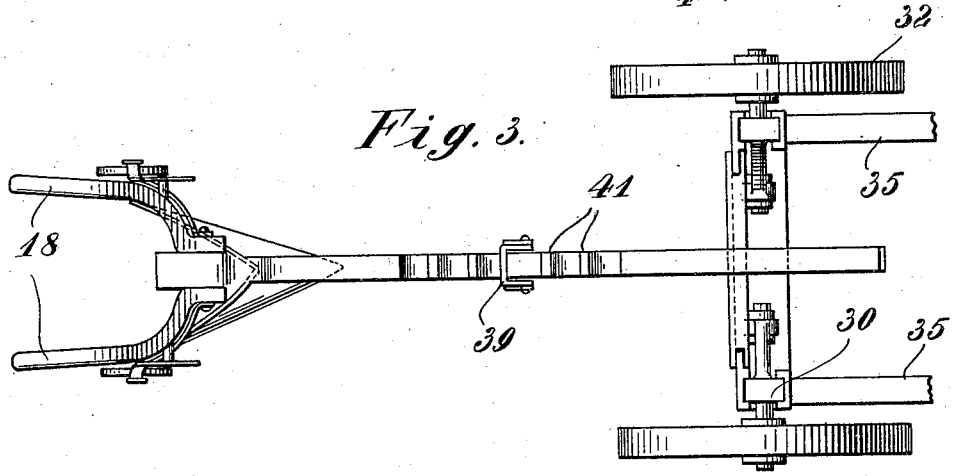
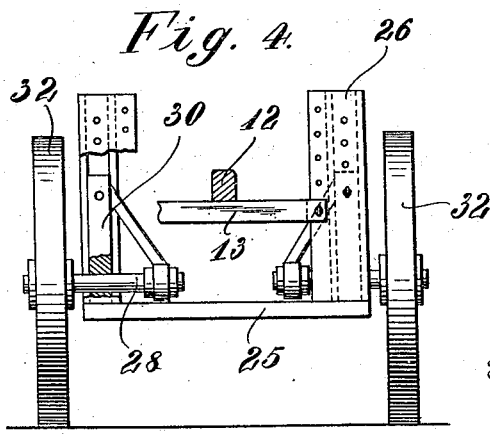
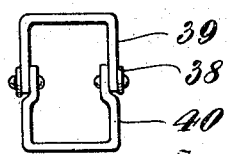
Inventor
Frank Tadkowski
By his Attorney Oscar Geier

FRANK TADKOWSKI, OF BALTIMORE, MARYLAND.

PLOW.

1,262,867.

Specification of Letters Patent.   Patented Apr. 16, 1918.

Application filed May 18, 1916.   Serial No. 98,290.

*To all whom it may concern:*

Be it known that I, FRANK TADKOWSKI, a subject of the Czar of Russia, and a resident of Baltimore, in the county of Baltimore and State of Maryland, have invented certain new and useful Improvements in Plows, of which the following is a specification.

This invention relates to improvements in agricultural implements of the type known as plows, used to scarify and break up the soil.

The principal object of the invention is to provide a plow which is guided with reference to furrows or lines on the surface of the soil, thereby avoiding irregularity of the furrows produced.

A second object is to provide means whereby the depth of the plow is adjustable, the beam being so sustained as to allow a desirable lateral movement permitting the plow-point to be guided by the operator, and finally, to provide means whereby the draft attachment may be made at various points along the plow beam according to conditions and circumstances attendant upon the field to be plowed, the tractive force employed, and preference of the operator.

These and other objects are attained by the novel combination and construction of parts hereafter described and shown in the accompanying drawings, forming a material part of this invention, and in which:—

Figure 1 is a perspective view of a plow made in accordance with the invention.

Fig. 2 is a side elevation of the same.

Fig. 3 is a plan view thereof.

Fig. 4 is a front elevation, parts being broken away to show the construction, and Fig. 5 is a detail view of the toggle joint used to connect the tractive force with the plow beam.

In the drawings, the numeral 10 is applied to the plow-share, rigidly attached to the plow-beam 11, the front portion 12 of which rests upon an adjustable bar 13 transversely disposed between standards 14 to which it is secured by pins 15 removably engaged in openings 16 formed in the standards.

To the rear portion of the beam 11 is attached the handles 18, the same being of the usual type and provided with bolts 19 securing a slotted segment 20 having at its lower end an axle 21 upon which are mounted wheels 22, links 23 connecting the axle to the pivot 24, set in the lower end of the handles 18 and passing through the rear of the beam 11.

Thus it is possible when the plow is not in actual use, to use the wheels 22 in the manner of a truck, the plow-share 10 at that time being raised from the surface of the ground as shown in Fig. 2.

The standards 14 are rigidly connected by a transverse bar 25 at their other lower ends, another pair of standards 26 being arranged parallel to them, and on the opposite side of the main axles 28, which is held in bearings 30 suitably engaged between the standards in a slide-way, so as to be vertically adjustable, thus allowing either wheel 32 to be raised as desired.

Thus the wheels may operate in different horizontal planes, one being in a furrow already plowed, while the other is on the normal surface of the soil, a condition very desirable in operating the plow with reference to other furrows.

Attached to the cross frame bar 25 are a pair of thills 35 or other similar means between which an animal as a horse or ox may be secured in drawing the plow in the usual manner. It will be noticed that the beam 12 is not rigidly secured to the standards 14 or 26, but merely rests on the cross bar 13 in such manner that it may be moved laterally thereon by operating the guide handles 18.

This arrangement also permits a lengthening or shortening of the distance between the wheels 32 and plowshare 10, which is accomplished by the use of a chain 38, one end of which is secured to the bar 25, and the other end to a toggle, comprising elements 39 and 40, which are engaged with angular teeth 41 and 42 formed respectively upon the upper and lower side of the plow-beam 11.

Thus it is possible to change the relative distance between the plow-share and the front wheels according to the desire of the operator.

Having thus described my invention, what I claim as new and desire to secure by Letters Patent, is:—

The combination in a device of the character described, of a pair of front supporting wheels, a frame carried thereby including a vertically adjustable bar, a plow beam having its forward end resting upon said adjustable bar, a plow element carried by the opposite end of said plow beam, said plow beam having oppositely disposed notches provided in the upper and lower edges thereof and having rearwardly inclined shoulders provided therein, a yoke member comprising two U-shaped members pivoted together at their leg elements and disposed upon the opposite sides of the plow beam with the arches thereof adapted to engage said shoulders and a chain connected to the pivoted leg terminals of said members and having its forward end connected to the frame substantially as and for the purposes set forth.

Signed at Baltimore, State of Maryland, this 25th day of April, A. D. 1916.

FRANK TADKOWSKI.

Copies of this patent may be obtained for five cents each, by addressing the "Commissioner of Patents, Washington, D. C."